US009350269B2

(12) United States Patent
Crookes et al.

(10) Patent No.: US 9,350,269 B2
(45) Date of Patent: May 24, 2016

(54) CONFIGURABLE HYBRID CONVERTER CIRCUIT

(75) Inventors: William Crookes, Salt-Salford (GB); David Trainer, Alvaston Derbyshire (GB); Colin Donald Murray Oates, Brocton (GB); Colin Charnock Davidson, Stafford (GB)

(73) Assignee: Alstom Technology Ltd., Baden (CH)

( * ) Notice: Subject to any disclaimer, the term of this patent is extended or adjusted under 35 U.S.C. 154(b) by 203 days.

(21) Appl. No.: 13/388,277

(22) PCT Filed: Jul. 31, 2009

(86) PCT No.: PCT/EP2009/059973
§ 371 (c)(1),
(2), (4) Date: Jan. 31, 2012

(87) PCT Pub. No.: WO2011/012171
PCT Pub. Date: Feb. 3, 2011

(65) Prior Publication Data
US 2012/0127766 A1 May 24, 2012

(51) Int. Cl.
H02M 7/06 (2006.01)
H02M 7/797 (2006.01)
(Continued)

(52) U.S. Cl.
CPC ............ *H02M 7/797* (2013.01); *H02J 3/1857* (2013.01); *H02J 3/36* (2013.01); *H02M 1/12* (2013.01);
(Continued)

(58) Field of Classification Search
CPC .......... H02M 5/458; H02M 5/42; H02M 7/19

USPC .......... 363/36, 37, 44, 48, 52, 53, 65, 67, 68, 363/69, 125, 126, 127
See application file for complete search history.

(56) References Cited

U.S. PATENT DOCUMENTS 3,857,083 A 12/1974 Lundstrom
3,867,643 A 2/1975 Baker et al.
(Continued)

FOREIGN PATENT DOCUMENTS

CN 101 795 072 A 8/2010
DE 43 17 965 A1 12/1994
(Continued)

OTHER PUBLICATIONS

International Search Report and Written Opinion in International Application No. PCT/EP2009/059973, mailed Aug. 13, 2010.
(Continued)

*Primary Examiner* — Adolf Berhane
*Assistant Examiner* — Afework Demisse
(74) *Attorney, Agent, or Firm* — Nixon Peabody LLP; Khaled Shami

(57) ABSTRACT

A circuit for a hybrid voltage source converter suitable for high voltage DC power transmission and reactive power compensation. The circuit comprises an assembly of electrically interconnected elements (Elements 1 to 20) including a plurality of first elements (Elements 1 to 6) and a plurality of second elements (Elements 7 to 20). Each of the first and second elements is configurable to be bypassed, to be disconnected or to include a circuit arrangement of one or more electronic components to construct, in use, a hybrid voltage source converter including at least one first element and at least one second element and in which the circuit arrangement included in the or each first element is different to the circuit arrangement included in the or each second element.

14 Claims, 8 Drawing Sheets

(51) Int. Cl.
 *H02J 3/18*    (2006.01)
 *H02J 3/36*    (2006.01)
 *H02M 1/00*    (2006.01)
 *H02M 7/483*    (2007.01)
 *H02M 1/12*    (2006.01)
 *H02M 1/14*    (2006.01)

(52) U.S. Cl.
 CPC ......... *H02M 1/14* (2013.01); *H02M 2001/0077* (2013.01); *H02M 2007/4835* (2013.01); *Y02E 40/26* (2013.01); *Y02E 60/60* (2013.01)

(56) References Cited

U.S. PATENT DOCUMENTS

| | | |
|---|---|---|
| 4,053,820 A | 10/1977 | Peterson et al. |
| 4,300,181 A | 11/1981 | Premerlani |
| 4,636,907 A | 1/1987 | Howell |
| 4,658,227 A | 4/1987 | Howell et al. |
| 4,663,702 A | 5/1987 | Tanaka |
| 4,816,736 A | 3/1989 | Dougherty et al. |
| 5,093,583 A | 3/1992 | Mashino et al. |
| 5,164,872 A | 11/1992 | Howell |
| 5,339,210 A | 8/1994 | Howell |
| 5,345,375 A | 9/1994 | Mohan |
| 5,499,178 A | 3/1996 | Mohan |
| 5,515,264 A | 5/1996 | Stacey |
| 5,532,575 A | 7/1996 | Ainsworth et al. |
| 5,644,482 A | 7/1997 | Asplund |
| 5,673,189 A * | 9/1997 | Schettler ................ 363/137 |
| 5,719,486 A | 2/1998 | Taniguchi et al. |
| 5,726,557 A | 3/1998 | Umeda et al. |
| 5,870,293 A | 2/1999 | Svensson et al. |
| 5,889,667 A | 3/1999 | Bernet |
| 5,892,677 A | 4/1999 | Chang |
| 5,936,855 A | 8/1999 | Salmon |
| 5,999,422 A | 12/1999 | Goransson et al. |
| 6,134,126 A | 10/2000 | Ikekame et al. |
| 6,137,704 A | 10/2000 | Ito et al. |
| 6,236,580 B1 | 5/2001 | Aiello et al. |
| 6,301,130 B1 | 10/2001 | Aiello et al. |
| 6,320,767 B1 | 11/2001 | Shimoura et al. |
| 6,392,348 B1 | 5/2002 | Dougherty |
| 6,603,675 B1 * | 8/2003 | Norrga ................ 363/132 |
| 6,879,062 B2 | 4/2005 | Oates |
| 6,987,680 B2 | 1/2006 | Vire et al. |
| 7,050,311 B2 * | 5/2006 | Lai .................. H02M 5/225 363/37 |
| 7,170,767 B2 | 1/2007 | Bixel |
| 7,199,535 B2 | 4/2007 | Welchko et al. |
| 7,274,576 B1 * | 9/2007 | Zargari et al. ................ 363/39 |
| 7,292,462 B2 | 11/2007 | Watanabe et al. |
| 7,298,115 B2 | 11/2007 | Nishimura et al. |
| 7,499,291 B2 | 3/2009 | Han |
| 7,622,825 B2 | 11/2009 | Brune et al. |
| 8,188,720 B2 * | 5/2012 | Kim et al. ................ 323/272 |
| 8,294,408 B2 | 10/2012 | Matt et al. |
| 8,390,259 B2 | 3/2013 | Dommaschk et al. |
| 8,599,591 B2 | 12/2013 | Crookes et al. |
| 8,854,843 B2 | 10/2014 | Trainer et al. |
| 8,861,231 B2 | 10/2014 | Cross et al. |
| 8,861,234 B2 | 10/2014 | Trainer et al. |
| 8,867,242 B2 | 10/2014 | Clare et al. |
| 8,867,244 B2 | 10/2014 | Trainer et al. |
| 8,891,209 B2 | 11/2014 | Hafner et al. |
| 8,934,268 B2 | 1/2015 | Trainer et al. |
| 9,065,299 B2 | 6/2015 | Trainer et al. |
| 9,130,458 B2 | 9/2015 | Crookes et al. |
| 2002/0060497 A1 | 5/2002 | Arita et al. |
| 2002/0149953 A1 | 10/2002 | Smedley et al. |
| 2002/0176265 A1 | 11/2002 | Oates |
| 2003/0202367 A1 | 10/2003 | Schreiber |
| 2004/0218318 A1 | 11/2004 | Bijlenga et al. |
| 2005/0127853 A1 | 6/2005 | Su |
| 2005/0135126 A1 | 6/2005 | Gazel et al. |
| 2005/0146226 A1 | 7/2005 | Trainer et al. |
| 2008/0002443 A1 * | 1/2008 | Ueda et al. ................ 363/126 |
| 2008/0007978 A1 * | 1/2008 | Han .................. H02M 7/19 363/35 |
| 2008/0137383 A1 | 6/2008 | Chang et al. |
| 2008/0179951 A1 | 7/2008 | Brune et al. |
| 2008/0205093 A1 | 8/2008 | Davies et al. |
| 2008/0258661 A1 | 10/2008 | Nagashima et al. |
| 2008/0310205 A1 | 12/2008 | Hiller |
| 2009/0027934 A1 | 1/2009 | Bustos |
| 2009/0033254 A1 | 2/2009 | Nagashima et al. |
| 2009/0085548 A1 | 4/2009 | Suh et al. |
| 2009/0102436 A1 | 4/2009 | Valderrama et al. |
| 2009/0206781 A1 | 8/2009 | Itoh et al. |
| 2010/0067266 A1 | 3/2010 | Dommaschk et al. |
| 2010/0118578 A1 | 5/2010 | Dommaschk et al. |
| 2010/0309698 A1 | 12/2010 | Asplund et al. |
| 2011/0018481 A1 | 1/2011 | Hiller |
| 2011/0149622 A1 | 6/2011 | Lin |
| 2011/0205768 A1 | 8/2011 | Svensson |
| 2011/0260701 A1 | 10/2011 | Horger et al. |
| 2012/0026767 A1 | 2/2012 | Inoue et al. |
| 2012/0063185 A1 | 3/2012 | Janning |
| 2012/0069610 A1 | 3/2012 | Trainer et al. |
| 2012/0120697 A1 | 5/2012 | Cuk |
| 2012/0170338 A1 | 7/2012 | Trainer et al. |
| 2012/0182771 A1 | 7/2012 | Trainer et al. |
| 2012/0188803 A1 | 7/2012 | Trainer et al. |
| 2012/0195084 A1 | 8/2012 | Norrga |
| 2012/0234796 A1 | 9/2012 | Juhlin |
| 2013/0020881 A1 | 1/2013 | Panousis et al. |
| 2013/0026841 A1 | 1/2013 | Hosini et al. |
| 2013/0051105 A1 | 2/2013 | Wang et al. |
| 2013/0094264 A1 | 4/2013 | Crookes et al. |
| 2013/0099572 A1 | 4/2013 | Norrga |
| 2013/0119970 A1 | 5/2013 | Trainer et al. |
| 2013/0128629 A1 | 5/2013 | Clare et al. |
| 2013/0128636 A1 | 5/2013 | Trainer et al. |
| 2013/0182467 A1 | 7/2013 | Cross et al. |
| 2013/0194838 A1 | 8/2013 | Jang et al. |
| 2013/0208514 A1 | 8/2013 | Trainer et al. |
| 2013/0208521 A1 | 8/2013 | Trainer et al. |
| 2013/0279211 A1 | 10/2013 | Green et al. |
| 2014/0098575 A1 | 4/2014 | Whitehouse |
| 2014/0133196 A1 | 5/2014 | Trainer et al. |
| 2014/0146583 A1 | 5/2014 | Trainer et al. |
| 2014/0254205 A1 | 9/2014 | Trainer et al. |
| 2014/0293656 A1 | 10/2014 | Trainer et al. |
| 2014/0293668 A1 | 10/2014 | Trainer et al. |
| 2014/0313797 A1 | 10/2014 | Davidson et al. |
| 2015/0009594 A1 | 1/2015 | Okaeme et al. |
| 2015/0116881 A1 | 4/2015 | Burnett et al. |
| 2015/0131189 A1 | 5/2015 | Davidson et al. |

FOREIGN PATENT DOCUMENTS

| | | |
|---|---|---|
| DE | 195 35 552 | 4/1996 |
| DE | 101 03 031 | 7/2002 |
| DE | 10 2005 040 432 A1 | 3/2007 |
| DE | 10 2007 003 172 A1 | 2/2008 |
| DE | 10 2008 045 247 A1 | 3/2008 |
| DE | 10 2008 014 898 A1 | 9/2009 |
| DE | 10 2010 007 452 A1 | 8/2011 |
| EP | 0 867 998 B1 | 3/2007 |
| EP | 1 800 391 | 6/2007 |
| GB | 2 294 821 | 5/1996 |
| GB | 2 375 902 A | 11/2002 |
| GB | 2 418 079 | 3/2006 |
| JP | 2008-125310 A | 5/2008 |
| WO | 97/02639 | 1/1997 |
| WO | 02/50972 A1 | 6/2002 |
| WO | 02/063758 | 8/2002 |
| WO | 03/055048 | 7/2003 |
| WO | 2007/023061 A2 | 3/2007 |
| WO | 2007/028349 | 3/2007 |
| WO | 2007/028350 | 3/2007 |
| WO | 2007/033852 A1 | 3/2007 |
| WO | 2008/024038 A1 | 2/2008 |
| WO | 2008/086760 | 7/2008 |

(56) References Cited

FOREIGN PATENT DOCUMENTS

| WO | 2009/149743 | | 12/2009 |
|---|---|---|---|
| WO | 2010/025758 | | 3/2010 |
| WO | 2010/040388 | A1 | 4/2010 |
| WO | 2010/069371 | | 6/2010 |
| WO | 2010/088969 | | 8/2010 |
| WO | 2010/112523 | A1 | 10/2010 |
| WO | 2010/145688 | | 12/2010 |
| WO | 2010/145689 | | 12/2010 |
| WO | 2010/145690 | | 12/2010 |
| WO | 2010/149200 | | 12/2010 |
| WO | 2011/012171 | A1 | 2/2011 |
| WO | 2011/012174 | | 2/2011 |
| WO | 2011/015227 | A1 | 2/2011 |
| WO | 2011/029480 | A1 | 3/2011 |
| WO | 2011/044928 | A1 | 4/2011 |
| WO | 2011/050832 | A1 | 5/2011 |
| WO | 2011/050847 | | 5/2011 |
| WO | 2011/098117 | | 8/2011 |
| WO | 2011/113471 | | 9/2011 |
| WO | 2011/124258 | | 10/2011 |
| WO | 2011/127980 | | 10/2011 |
| WO | 2011/141054 | A1 | 11/2011 |
| WO | 2011/157300 | | 12/2011 |
| WO | 2012/013248 | | 2/2012 |
| WO | 2012/025142 | | 3/2012 |
| WO | 2012/167826 | | 12/2012 |
| WO | 2013/000510 | | 1/2013 |
| WO | 2013/071975 | A1 | 5/2013 |
| WO | 2013/017160 | A1 | 7/2013 |
| WO | 2013/017177 | A1 | 7/2013 |
| WO | 2013/127461 | A1 | 9/2013 |
| WO | 2013/127462 | A1 | 9/2013 |
| WO | 2013/127463 | A1 | 9/2013 |

OTHER PUBLICATIONS

Allebrod, S. et al., "New Transformerless, Scalable Modular Multilevel Converters for HVDC—Transmission", Power Electronics Specialists Conference, IEEE, Jun. 15, 2008, pp. 174-179.

Baran M. E. et al., "Overcurrent Protection in DC Zonal Shipboard Power Systems uisng Solid State Protection Devices", Electric Ship Technologies Symposium, 2007. ESTS '07. IEEE, IEEE, PI, May 1, 2007, pp. 221-224.

Glinka M., "Prototype of Multiphase Modular-Multilevel-Converter with 2MW Power Rating and 17-Level-Output-Voltage", 2004 35th Annual IEEE Power Electronics Specialists Conference, Jun. 20-25, 2004, pp. 2572-2576.

Guanjun Ding et al., "New Technologies of Voltage Source Converter (VSC) for HVDC Transmission System Based on VSC", Power and Energy Society General Meeting—Conversion and Delivery of Electrical Energy in the 21st Century, 2008 IEEE, IEEE, Piscataway, NJ, USA, Jul. 20, 2008, p. 1-8.

Hagiwara, Makoto et al., "PWM Control and Experiment of Modular Multilevel Converters", Power Electronics Specialists Conference, PESC 2008, IEEE, Piscataway, NJ, USA, pp. 154-161, (2008).

Hongbo, Jiang, et al., "Harmonic Cancellation of a Hybrid Converter", High Power Electronics, The Royal Institute of Technology, Stockholm Sweden, IEEE Transactions on Power Delivery, vol. 13, No. 4, Oct. 1998, pp. 1291-1296.

Knudsen, L. et al., "Description and Prospective Applications of New Multi-Terminal HVDC System Concepts", CIGRE Conf. Internationale Des Grands Reseaux Electriques, Aug. 26-Sep. 1, 1990, pp. 1-11.

Lesnicar, A. et al., "A New Modular Voltage Source Inverter Topology", pp. 1-10, (2003), XP002454302.

Lesnicar, A. et al., "An Innovative Modular Multilevel Converter Topology Suitable for a Wide Power Range", 2003 IEEE Bologna PowerTech Conference, Jun. 23-26, 2003, pp. 1-6.

Liu, Y.H. et al., "A New STATCOM Configuration Using Multi-Level DC Voltage Reinjection for High Power Application", IEEE Transactions on Power Delivery, vol. 19, No. 4, Oct. 2004, New Zealand, pp. 1828-1834.

Liu, Y.H. et al., "A New High-Pulse Voltage-Sourced Converter for HVdc Transmission", IEEE Transactions on Power Delivery, vol. 18, No. 4, Oct. 2003, New Zealand, pp. 1388-1393.

Qahraman, B. et al., "A VSC Based Series Hybrid Converter for HVDC Transmission", IIEE 0-7803-8886-0/05 CCECE/CCGEI, Saskatoon, May 2005, pp. 458-461.

Raju, N. Ravisekhar, "A DC Link-Modulated Three-Phase Converter", Silicon Power Corp., IEEE, 0-7803-7116-X/01, 2001, pp. 2181-2185.

Su, Gui-Jia et al., "Multilevel DC Link Inverter for Brushless Permanent Magnet Motors with Very Low Inductance", Prepared by Oak Ridge National Laboratory for U.S. Dept. of Energy, 2001, IEEE 0-7803-7116-x/01, pp. 829-834.

Wong, C. et al., "Feasibility Study of AC and DC-Side Active Filters for HDVC Converter Terminals", IEEE Transactions on Power Delivery, vol. 4, No. 4, Oct. 1989, New York, NY, USA, pp. 2067-2075.

Zhang, W. et al., "Active DC Filter for HVDC Systems", IEEE Computer Applications in Power, vol. 7, No. 1, Jan. 1994, New York, USA, pp. 40-44.

PCT International Search Report and Written Opinion for Application No. PCT/EP2009/057388, mailed on Mar. 18, 2010.

PCT International Preliminary Report on Patentability in International Application No. PCT/EP2009/057388, mailed on Dec. 14, 2011.

PCT International Search Report and Written Opinion in International Application No. PCT/EP2009/057736, mailed on Mar. 26, 2010.

PCT International Preliminary Report on Patentability in International Application No. PCT/EP2009/057736, mailed on Nov. 24, 2011.

PCT International Preliminary Report on Patentability in International Application No. PCT/EP2009/059973, mailed on Oct. 5, 2011.

PCT International Search Report and Written Opinion in International Application No. PCT/EP2010/051572, mailed on Jan. 19, 2011.

PCT International Preliminary Report on Patentability in International Application No. PCT/EP2010/051572, mailed on Apr. 20, 2012.

PCT International Search Report and Written Opinion in International Application No. PCT/EP2010/053290, mailed on Feb. 11, 2011.

PCT International Preliminary Report on Patentability in International Application No. PCT/EP2010/053290, mailed on Apr. 20, 2012.

PCT International Search Report and Written Opinion in International Application No. PCT/EP2010/054660, mailed on Feb. 24, 2011.

PCT International Preliminary Report on Patentability in International Application No. PCT/EP2010/054660, mailed on Jun. 6, 2012.

PCT International Search Report for International Application No. PCT/EP2010/054974, mailed on Mar. 4, 2011.

PCT International Preliminary Report on Patentability in International Application No. PCT/EP2010/054974, mailed on Aug. 10, 2012.

PCT International Search Report and Written Opinion in International Application No. PCT/EP2010/058630, mailed on Apr. 19, 2011.

PCT International Preliminary Report on Patentability in International Application No. PCT/EP2010/058630, mailed on Dec. 19, 2012.

PCT International Search Report and Written Opinion for Application No. PCT/EP2010/061145, mailed on Jun. 5, 2011.

PCT International Preliminary Report on Patentability in International Application No. PCT/EP2010/061145, mailed on Aug. 20, 2012.

PCT International Search Report and Written Opinion in International Application No. PCT/EP2011/059514, mailed on Jul. 5, 2012.

PCT International Preliminary Report on Patentability in International Application No. PCT/EP2011/059514, mailed on Aug. 1, 2013.

(56) References Cited

OTHER PUBLICATIONS

PCT International Search Report and Written Opinion in International Application No. PCT/EP2011/060907, mailed on Jul. 16, 2012.
PCT International Preliminary Report on Patentability in International Application No. PCT/EP2011/060907, mailed on Sep. 24, 2013.
Notice of Allowance in U.S. Appl. No. 13/378,336, mailed on Feb. 6, 2014.
Notice of Allowance in U.S. Appl. No. 13/380,500, mailed on Jun. 11, 2013.
Notice of Allowance in U.S. Appl. No. 13/380,500, mailed on Jul. 31, 2013.
Notice of Allowance in U.S. Appl. No. 13/576,920, mailed on Dec. 4, 2013.
Notice of Allowance in U.S. Appl. No. 13/576,920, mailed on Mar. 20, 2014.
U.S. Appl. No. 14/129,923, filed Dec. 27, 2013.
PCT International Search Report and Written Opinion in International Application No. PCT/EP10/62316, mailed on Jul. 6, 2011.
PCT International Search Report in International Application No. PCT/EP2011/070402, mailed on Sep. 27, 2012.
PCT International Preliminary Report on Patentability in International Application No. PCT/EP2011/070402, mailed on Feb. 18, 2014.
First Chinese Office Action in Application No. 2009801607004, mailed Jun. 25, 2014.
Notice of Allowance in U.S. Appl. No. 13/378,336, mailed on Jun. 13, 2014.
Notice of Allowance in U.S. Appl. No. 13/576,920, mailed on Jun. 9, 2014.
Office Action in U.S. Appl. No. 13/639,844, mailed on May 22, 2014.
Notice of Allowance in U.S. Appl. No. 13/640,468, mailed on Jun. 4, 2014.
Notice of Allowance in U.S. Appl. No. 13/813,414, mailed on Jun. 2, 2014.
Notice of Allowance in U.S. Appl. No. 13/818,654, mailed on May 30, 2014.
Notice of Allowance in U.S. Appl. No. 13/639,844, mailed on Sep. 8, 2014.
U.S. Appl. No. 14/357,908, filed May 13, 2014.
Office Action in U.S. Appl. No. 14/129,923, mailed on Feb. 17, 2015.
Office Action in U.S. Appl. No. 14/359,088, mailed on Apr. 7, 2015.
Notice of Allowance in U.S. Appl. No. 13/634,205, mailed on Apr. 27, 2015.
Davidson, C.C et al., "Innovative Concepts for Hybrid Multi-Level Converters for HVDC Power Transmission", 9th IET International Conference on AC and DC Power Transmission, ACDC 2010, Oct. 19-21, 2010, 5 pages.
Ertl, H et al., "A Constant Output Current Three-Phase Diode Bridge Rectifier Employing a Novel Electronic Smoothing Inductor", IEEE Transactions on Industrial Electronics, vol. 52, Issue 2, Apr. 1, 2005, pp. 454-461.
Flourentzou, Nikolas et al., "VSC-Based HVDC Power Transmission Systems: An Overview", IEEE Transactions on Power Electronics, vol. 24, No. 3, Mar. 2009, pp. 592-602.
Merlin, M.M.C. et al. "A New Hybrid Multi-Level Voltage-Source Converter With DC Fault Blocking Capability", 9th IET International Conference on AC and DC Power Transmission, ACDC 2010, Oct. 19-21, 2010, 5 pages.
Watkins, S.J. et al., "Multilevel Asymmetric Power Converters for Switched Reluctance Machines", International Conference on Power Electronics, Machines and Drives, Apr. 16-18, 2002, IEEE 2002, Conf. Publ. No. 487, pp. 195-200.
PCT International Preliminary Report on Patentability in International Application No. PCT/EP10/62316, mailed on Mar. 7, 2013.
PCT International Search Report and Written Opinion in International Application No. PCT/EP2011/063207, mailed May 30, 2012.
PCT International Preliminary Report on Patentability in International Application No. PCT/EP2011/063207, mailed on Apr. 2, 2014.
PCT International Search Report and Written Opinion in International Application No. PCT/EP2011/064545, mailed Jun. 11, 2012.
PCT International Preliminary Report on Patentability in International Application No. PCT/EP2011/064545, mailed May 19, 2014.
PCT International Search Report and Written Opinion in International Application No. PCT/EP2012/053571, mailed on Jun. 20, 2012.
PCT International Preliminary Report on Patentability in International Application No. PCT/EP2012/053571, mailed on Sep. 12, 2014.
PCT International Search Report and Written Opinion in International Application No. PCT/EP2012/053574, mailed on Nov. 20, 2012.
PCT International Preliminary Report on Patentability in International Application No. PCT/EP2012/053574, mailed on Jul. 21, 2014.
PCT International Search Report and Written Opinion in International Application No. PCT/EP2012/053573, mailed on Dec. 4, 2012.
PCT International Preliminary Report on Patentability in International Application No. PCT/EP2012/053573, mailed on Jul. 21, 2014.
Office Action in U.S. Appl. No. 13/634,205, mailed on Sep. 22, 2014.
Notice of Allowance in U.S. Appl. No. 13/805,333, mailed on Feb. 2, 2015.
U.S. Appl. No. 14/379,746, filed Aug. 28, 2014.
U.S. Appl. No. 14/381,570, filed Aug. 27, 2014.
Examiner-Initiated Interview Summary, dated Jan. 5, 2016, issued in U.S. Appl. No. 14/359,088, 3 pages.
Office Action, dated Mar. 16, 2016, issued in U.S. Appl. No. 14/381,570, 32 pages.
Office Action, dated Mar. 23, 2016, issued in U.S. Appl. No. 14/379,746, 31 pages.

* cited by examiner

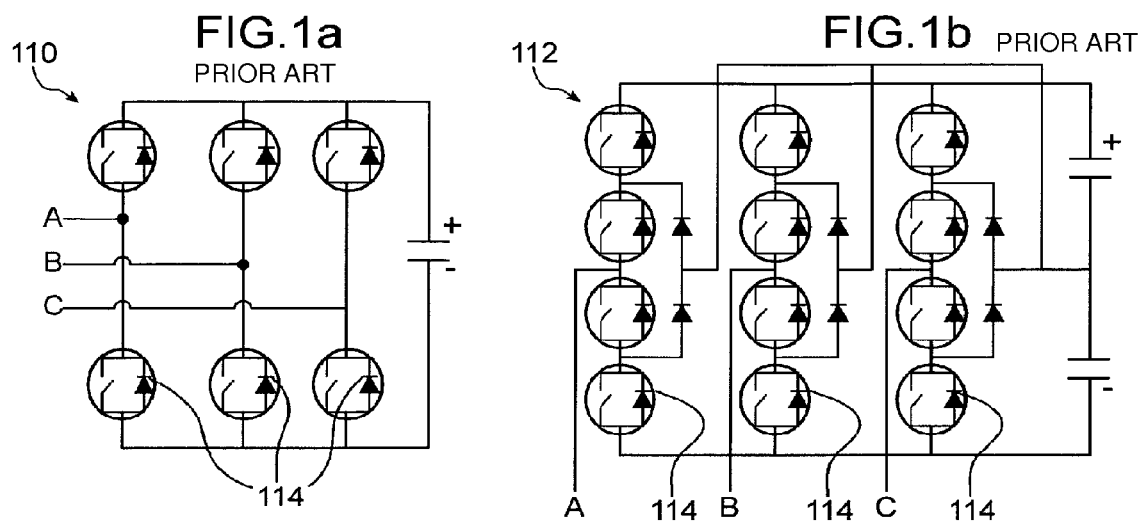
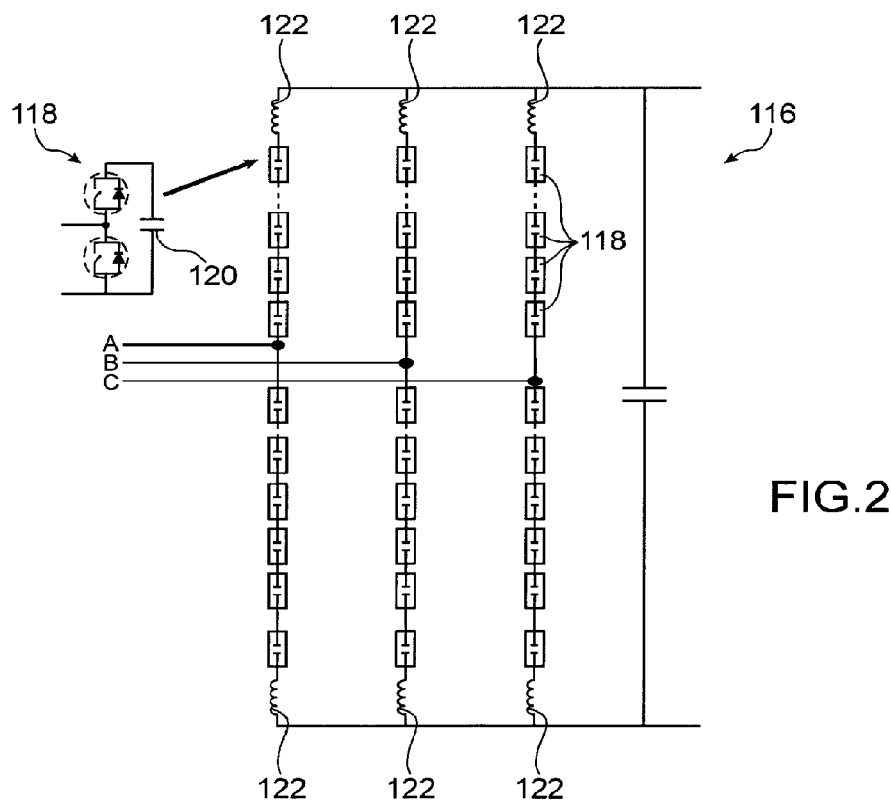

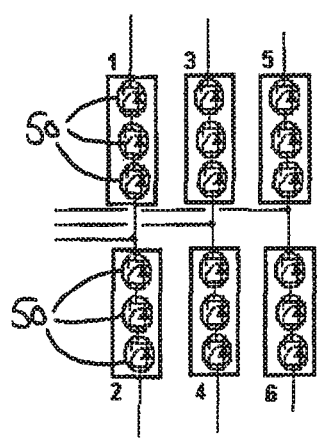
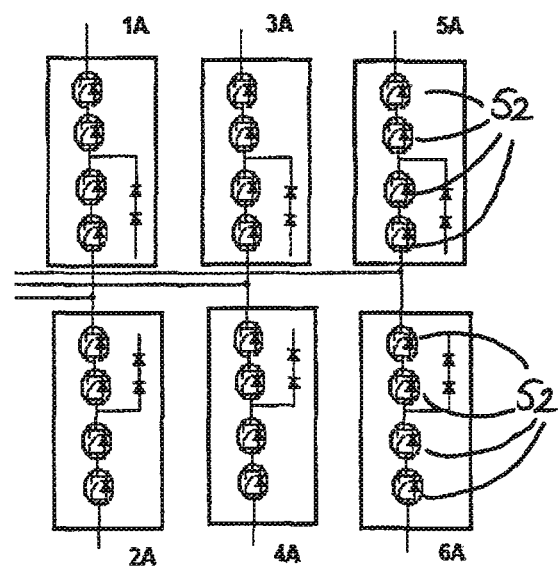
Figure 4a
Figure 4b

US 9,350,269 B2

CONFIGURABLE HYBRID CONVERTER CIRCUIT

CROSS REFERENCE TO RELATED APPLICATIONS OR PRIORITY CLAIM

This application is a National Phase of PCT/EP2009/059973, filed Jul. 31, 2009, entitled, "CONFIGURABLE HYBRID CONVERTER CIRCUIT", the contents of which are incorporated herein by reference in their entirety.

The invention relates to a circuit for a hybrid voltage source converter suitable for high voltage direct current (DC) power transmission and reactive power compensation.

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC power to DC power is also utilized in power transmission networks where it is necessary to interconnect the AC networks operating at different frequencies.

In any such power transmission network, converters are required at each interface between AC and DC power to effect the required conversion, and one such form of converter is a voltage source converter (VSC).

Voltage source converters may employ switches based on semiconductor technology that control the flow of current. When combined with passive components that provide temporary energy storage, the ability of these switches to operate rapidly permits electrical power in practically any form to be converted to a different form with minimal losses.

The emphasis on making such power conversion efficient and compact has focused development on increasing the frequency of operation so that the size of the passive components can be reduced.

For power conversion equipment involving high voltages, high frequency switching is not desirable since it creates high stressing on insulation, and series semiconductor switches must be configured to operate within the operating parameters of the poorest of the switches. The converter losses therefore become exaggerated.

The size of the passive components in power conversion equipment, such as capacitors and inductors, are typically large to accommodate various tasks including constraining of voltage variation and current flow regulation. In addition the size of the power conversion scheme may also be increased by the provision of electrical insulation or protective conductive shields around the converter for safety purposes. The size and weight of converters also affect the footprint of the HVDC station, which can be costly due to the high costs of real estate.

It is known in voltage source converters to use six-switch (two-level) and three-level converter topologies 110, 112 with insulated gate bipolar transistors (IGBT) 114, as shown in FIGS. 1a and 1b. The IGBT devices 114 are connected and switched together in series to enable high power ratings of 10's to 100's of MW to be realized.

This conventional approach may however require a complex and active IGBT drive, and typically requires large passive snubber components to ensure that the high voltage across the series strings of IGBT devices 114 shares properly during converter switching. In addition, the IGBT devices 114 need to switch on and off several times at high voltage over each cycle of the AC supply frequency to control the harmonic currents being fed to the AC network. These factors lead to high losses, high levels of electromagnetic interference and a complex design.

It is also known in voltage source converters to use a multilevel converter arrangement 116 such as that shown in FIG. 2. In such a conventional multi-level converter 116 converter bridges or cells 118 are connected in series, each cell 118 being switched at a different time.

The conventional multilevel converter arrangement 116 eliminates the problems associated with direct switching of series connected IGBT devices 114 because the individual cells 118 do not switch simultaneously and the converter voltage steps are comparatively small. Each cell 118 however requires a large DC link capacitor 120 to carry fundamental frequency and direct current components. Six DC side reactors 122 are required to enable a parallel connection and operation of converter limbs, and are primarily used to limit transient current flow between the converter limbs. These factors lead to expensive, large and heavy equipment with significant amounts of stored energy. This makes pre-assembly, testing and transportation of the equipment difficult.

According to an aspect of the invention there is provided a circuit for a hybrid voltage source converter suitable for high voltage DC power transmission and reactive power compensation, the circuit comprising an assembly of electrically interconnected elements including a plurality of first elements and a plurality of second elements, each of the first and second elements being configurable to be bypassed, to be disconnected or to include a circuit arrangement of one or more electronic components to construct, in use, a hybrid voltage source converter including at least one first element and at least one second element and in which the circuit arrangement included in the or each first element is different to the circuit arrangement included in the or each second element.

The circuit of the invention facilitates the creation of a voltage source converter structure in which at least two different circuit arrangements are connected to each other and therefore facilitates the creation of a hybrid structure having the different advantages of the respective circuit arrangements. Such advantages may include, depending on the actual circuit arrangements employed, reduction in DC link capacitance, reduction in DC side reactors, simplification of series IGBT converter components and reduction in energy losses.

The assembly of electrically interconnected elements effectively defines a flexible circuit structure for the construction of a hybrid voltage source converter that allows a designer of such power converters to include standard circuit arrangements in selected elements whilst bypassing or disconnecting the other elements, and therefore easily allows a variety of different possible configurations of voltage source converter to be produced.

The circuit of the invention therefore provides an effective means for identifying the best possible configuration for a particular power conversion problem in that it allows a number of different configurations of voltage source converter to undergo investigation, comparison and optimization quickly. It therefore allows the time required to develop a converter design to be shortened.

The flexibility provided by the assembly of electrically interconnected components allows a hybrid voltage source converter including the circuit to cope with the demands of different AC and DC networks, and the circuit preferably therefore includes AC terminals connectable, in use, to an AC network and DC terminals connectable, in use, to a DC network.

In such embodiments the assembly of electrically interconnected elements preferably includes a first set of the plurality of second elements interconnected between the AC terminals and the plurality of first elements and a second set of the plurality of second elements interconnected between the plurality of first elements and the DC terminals.

This arrangement maximizes the flexibility of the circuit in that it allows one or more second elements to be included in the AC power lines and/or the DC power lines.

To further maximize the flexibility of the circuit, a third set of the plurality of second elements is preferably interconnected between neutral point connections defined by the second set of the plurality of second elements and the DC terminals.

In embodiments of the invention each of the first elements may be configurable to include a plurality of semiconductor switches connected in series.

Such an arrangement allows the implementation of near zero voltage and or current switching of the series connected semiconductor switches in a hybrid voltage source converter, reducing switching losses and simplifying the hardware required to control dynamic and steady-state voltage sharing.

In other embodiments of the invention each of the first elements may be configurable to include a plurality of semiconductor switches connected to define a multi-level converter element so as to allow the creation of a multi-level converter without affecting the other elements of the hybrid voltage source converter.

Each of the second elements is preferably configurable to include:
at least one energy storage device to provide a nominally fixed voltage source; and/or
at least one module, the or each module including an energy storage device connected with at least one pair of semiconductor switches that are controllable, in use, to provide a continuously variable voltage source.

Preferably, in embodiments in which at least one of the second elements is configurable to include at least one module, the or each of the respective second elements is configurable to include a plurality of modules connected in series so as to define a chain-link converter element.

In such embodiments the circulating path for switching is contained within the module, which provides minimum self-inductance and makes the switching operation more efficient.

The or each module may include an energy storage device connected in parallel with a pair of semiconductor switches in a half-bridge arrangement to define a 2-quadrant unipolar module that can develop zero or positive voltage and can conduct current in both directions.

In other embodiments, the or each module may include an energy storage device connected in parallel with two pairs of semiconductor switches in a full-bridge arrangement to define a 4-quadrant bipolar module that can develop zero, positive or negative voltage and can conduct current in both directions.

The or each energy storage device may be connected to an auxiliary power bus so as to enable real power to be transferred into and out of the or each energy storage device to maintain a voltage balance.

In other embodiments the or each energy storage device may be connectable temporarily to an external voltage source to reset the energy storage device.

Preferably the or each energy storage device is a capacitor, which can be charged to store energy and inserted into circuit to provide a voltage step.

In other embodiments, the or each energy storage device may be a battery, a fuel cell, a photo-voltaic cell or an AC generator-rectified source, each of which allows power to be transferred into or out of the energy storage device to maintain voltage balance.

The semiconductor included in any of the first and second elements is preferably provided in the form of an insulated gate-bipolar transistor, a gate turn-off thyristor or a field-effect transistor.

The use of semiconductor switches in a voltage source converter is advantageous because such devices are small in size and weight, and have relatively low power dissipation, which minimizes the need for cooling equipment. It therefore leads to significant reductions in power converter cost, size and weight.

Preferred embodiments of the invention will now be described, by way of non-limiting examples, with reference to the accompanying drawings in which:

FIGS. 1a and 1b show schematic illustrations of two prior art voltage source converters for HVDC power transmission;

FIG. 2 shows a schematic illustration of another prior art voltage source converter for HVDC power transmission;

FIG. 4a shows a first element configured to include semiconductor switches connected in series;

FIG. 4b shows a first element configured to include semiconductor switches connected to form a multi-level converter element;

Figure 3:
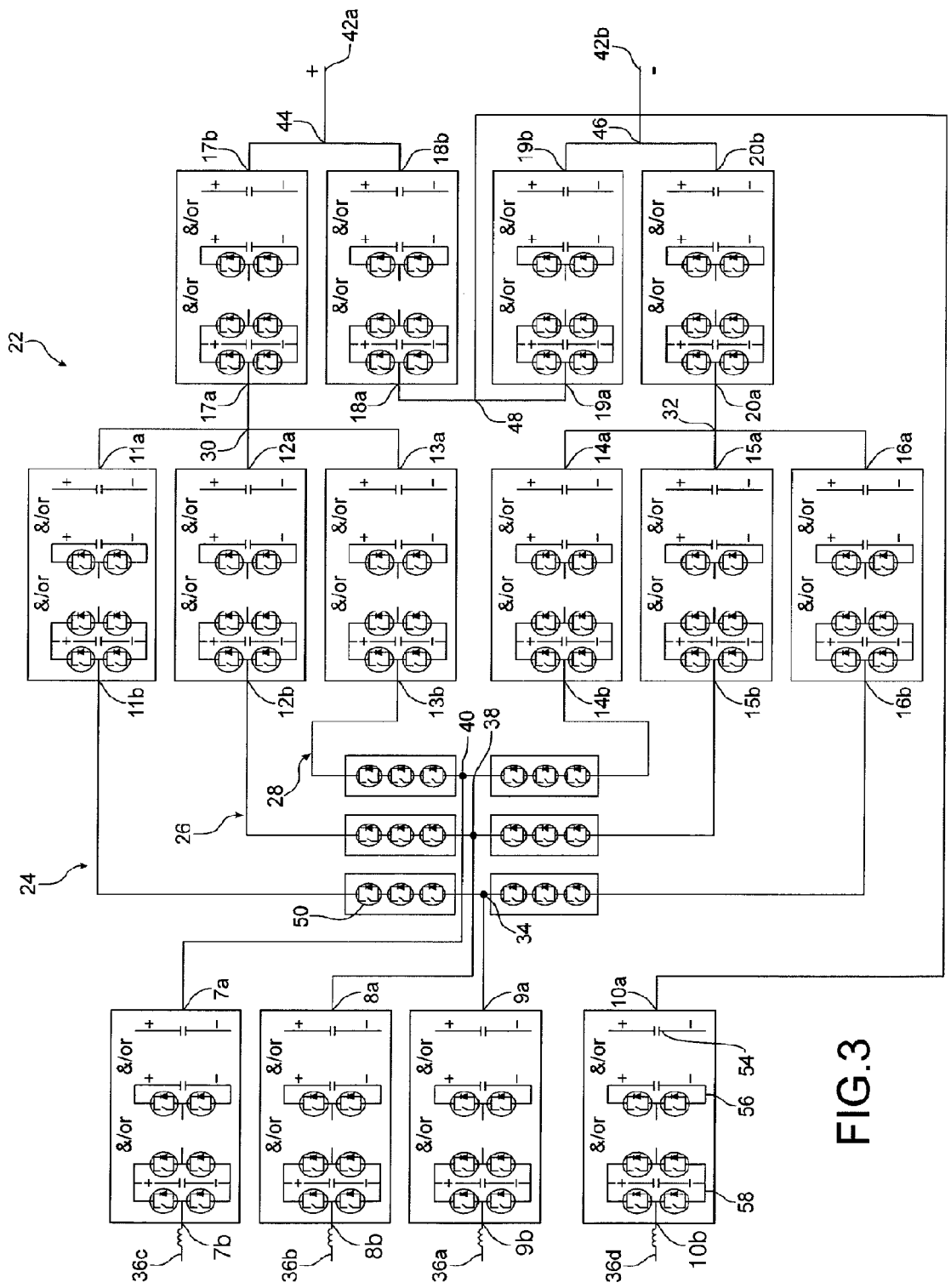
FIG. 3 shows a schematic illustration of a circuit according to an embodiment of the invention.

A circuit 22 for a hybrid voltage source converter suitable for high voltage DC power transmission and reactive power control is shown in FIG. 3. The circuit 22 comprises an assembly of electrically interconnected elements, which include a plurality of first elements, Elements 1 to 6 and a plurality of second elements, Elements 7 to 20.

In the embodiment shown in FIG. 3, the first and second elements are interconnected to define three converter limbs 24,26,28, each limb extending between a first connection point 30 and a second connection point 32.

More specifically, Elements 1, 2, 11 and 16 are connected in series between the first and second terminals 30,32 of the first converter limb 24 so that a first end 11a of Element 11 is connected to the first connection point 30 and a second end 11b of Element 11 is connected to Element 1. A first end 16a of Element 16 is connected to the second connection point 32 and a second end 16b of Element 16 is connected to Element 2. Elements 1 and 2 are connected to each other at a midpoint 34 of the first converter limb 24, which is also connected to a first end 9a of Element 9. A second end 9b of Element 9 is connected to an AC terminal 36a for connection to an AC network.

Elements 3, 4, 12 and 15 are connected in series between the first and second terminals 30,32 of the second converter limb 26 so that a first end 12a of Element 12 is connected to the first connection point 30 and a second end 12b of Element 12 is connected to Element 3. A first end 15a of Element 15 is connected to the second connection point 32 and a second end 15b of Element 15 is connected to Element 4. Elements 3 and 4 are connected to each other at a midpoint 38 of the second converter limb 26, which is also connected to a first end 8a of Element 8. A second end 8b of Element 8 is connected to an AC terminal 36b for connection to an AC network.

Elements 5, 6, 13 and 14 are connected in series between the first and second terminals 30,32 of the third converter limb 28 so that a first end 13a of Element 13 is connected to the first connection point 30 and a second end 13b of Element 13 is connected to Element 5. A first end 14a of Element 14 is connected to the second connection point 32 and a second end 14b of Element 14 is connected to Element 6. Elements 5 and 6 are connected to each other at a midpoint 40 of the third converter limb 28, which is also connected to a first end 7a of Element 7. A second end 7b of Element 7 is connected to an AC terminal 36c for connection to an AC network.

The first connection point 30 of each of the first, second and third converter limbs 24,26,28 is connected to a first end 17a of Element 17. The second connection point 32 of each of the first, second and third converter limbs 24,26,28 is connected to a first end 20a of Element 20 of Element 20.

Elements 17, 18, 19 and 20 are connected in series so that a second end 17b of Element 17 is connected to a second end 18b of Element 18, a second end 18a of Element 18 is connected to a first end 19a of Element 19 and a second end 19b of Element 19 is connected to a second end 20b of Element 20.

A first DC terminal 42a is connected to a midpoint 44 between Elements 17 and 18 and a second DC terminal 42b is connected to a midpoint 46 between Elements 19 and 20.

The final element, Element 10, is connected between an AC terminal 36d and a midpoint 48 between Elements 18 and 19, the first end 10a of Element 10 being connected to the midpoint 48 and the second end 10b of Element 10 being connected to the AC terminal 36d.

The circuit 22 therefore includes:
a first set of second elements, Elements 7 to 9 connected between the AC terminals 36a-36c and an AC side of the first elements, Elements 1 to 6;
a second set of second elements, Elements 11 to 16 connected between a DC side of the first elements, Elements 1 to 6 and a third set of second elements, Elements 17 to 20; and
a third set of second elements, Elements 17 to 20, connected between neutral point connections 30,32 of the second set of second elements, Elements 11 to 16, and the DC terminals 42a,42b.

During use of the circuit 22 to construct a hybrid voltage source converter, each of the first and second elements is configurable to be bypassed, to be disconnected or to include a circuit arrangement of one or more electronic components.

In the embodiment shown in FIG. 3, each of the first elements, Elements 1 to 6, is configurable to include a plurality of series connected semiconductor switches 50 (FIG. 4a) and may allow the implementation of near zero voltage and or current switching of the semiconductor switches 50 in the hybrid voltage source converter.

In other embodiments, each of the first elements, Elements 1 to 6, may include a plurality of semiconductor switches 52 (FIG. 4b) connected to define a multi-level converter element so as to allow the creation of a multi-level converter without affecting the other elements.

In the embodiment shown in FIG. 3, each of the second elements, Elements 7 to 20, is configurable to include a fixed capacitor 54, one or more unipolar modules 56 and/or one or more bipolar modules 58.

Figure 5A:
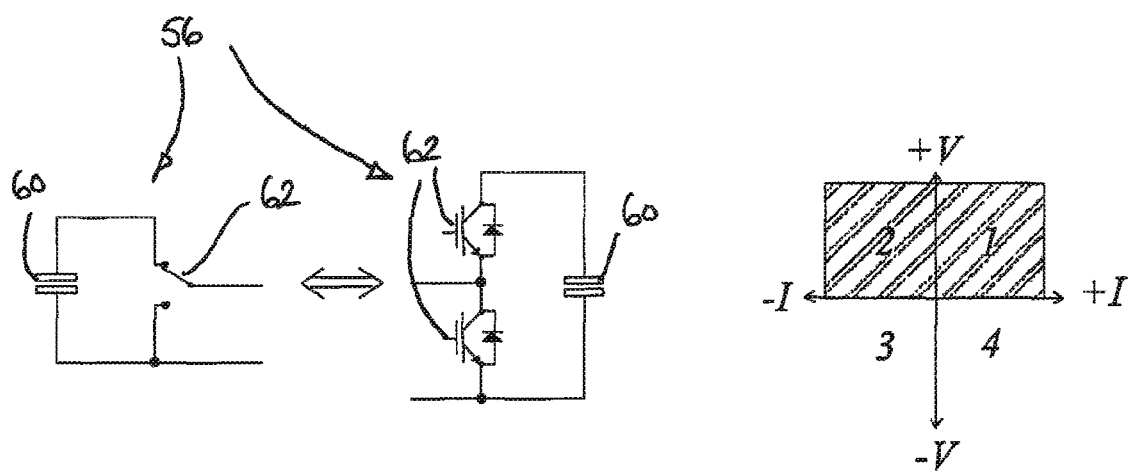
FIG. 5a shows a 2-quadrant unipolar module.

Referring to FIG. 5a, a unipolar module 56 includes a capacitor 60 connected in parallel with a pair of semiconductor switches 62 in a half-bridge arrangement that can develop zero or positive voltage and can conduct current in both directions.

Figure 5B:
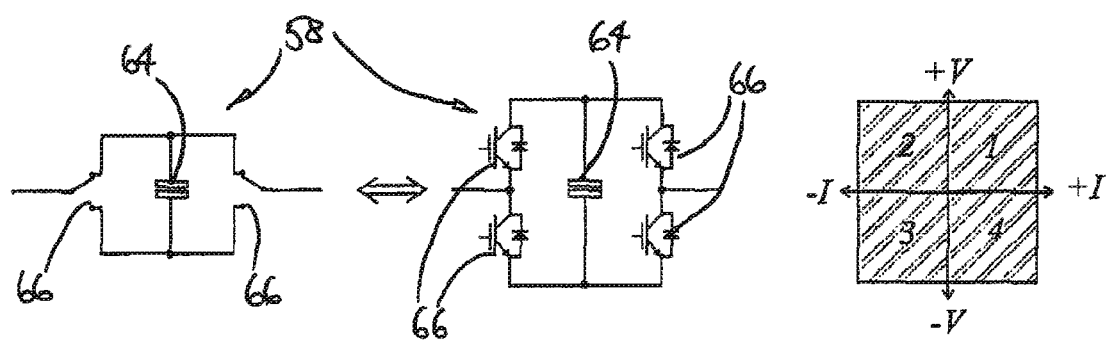
FIG. 5b shows a 4-quadrant bipolar module.

Referring to FIG. 5b, a bipolar module 58 includes a capacitor 64 connected in parallel with two pairs of semiconductor switches 66 in a full-bridge arrangement that can develop zero, positive or negative voltage and can conduct current in both directions.

It is envisaged that each of the second elements is configured to include one or more fixed capacitors 54 or a chain of series connected unipolar modules 56 or a chain of series connected bipolar modules 58.

It is also envisaged that each of the second elements may be configured to include a combination of fixed capacitors 54 and/or unipolar modules 56 and/or bipolar modules 58 depending on the power conversion requirements.

Figure 6:
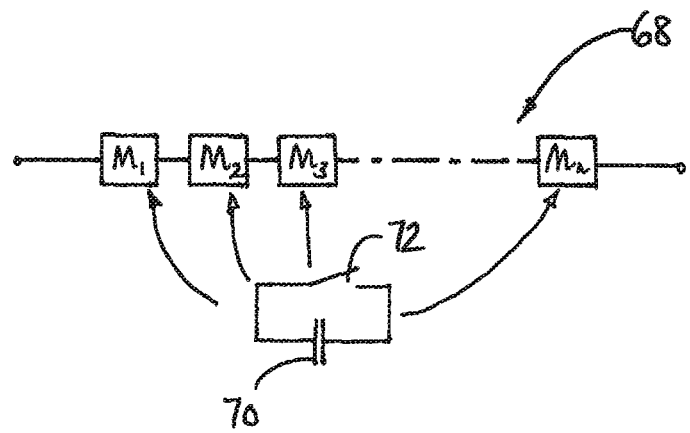
FIG. 6 shows a schematic illustration of a second element configured to include a plurality of modules connected in series to form a chain-link converter.

The use of a chain of series connected unipolar or bipolar modules 56,58 allows the incorporation of a chain-link converter 68 (FIG. 6) into the hybrid voltage source converter, the chain-link converter 68 including a series of modules $M_1, M_2, M_3 \ldots M_n$ that each include a charged capacitor 70 that may be bypassed or connected in series in either a forward or reverse direction using one or more pairs of semiconductor switches 72 to yield a continuously variable voltage source.

The circulating path for the semiconductor switching is contained within each module $M_1, M_2, M_3 \ldots M_n$ leading to minimum self-inductance and making the switching operation more efficient.

Figure 7:
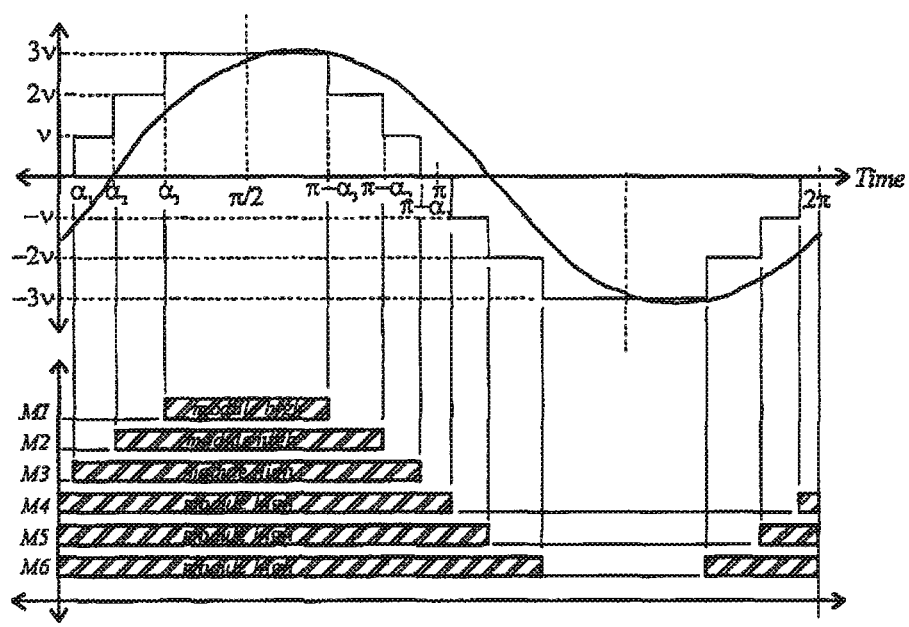
FIG. 7 shows synthesis of a 50 Hz waveform using the chain-link converter of FIG. 6.

The use of a chain-link converter including a plurality of bipolar modules is exemplified in FIG. 7 in which a 50 Hz power waveform is synthesized by staggering the switching of the individual modules. Although many switching operations are taking place, they are contained within individual modules and the number of switching operations may be as low as the frequency of the power voltage.

Configuration of one or more of the second elements to include a chain-link converter during construction of a hybrid voltage source converter is desirable because, in the event of a DC side fault during use of the hybrid voltage source converter, the chain-link converter may be used to create voltage steps to oppose any driving voltage from the AC side of the converter and thereby extinguish any fault current.

Preferably the semiconductor switches 50,52,62,66 are constructed from insulated gate bipolar transistors, gate turn-off thyristors, field-effect transistors or any similar self-commutated semiconductor switch.

The first and second elements of the circuit 22 are configurable during construction of a hybrid voltage source converter so that at least one first element, Elements 1 to 6, is connected to at least one second element, Elements 7 to 20, and the circuit arrangement included in the first and second so connected elements are different.

Figure 8:
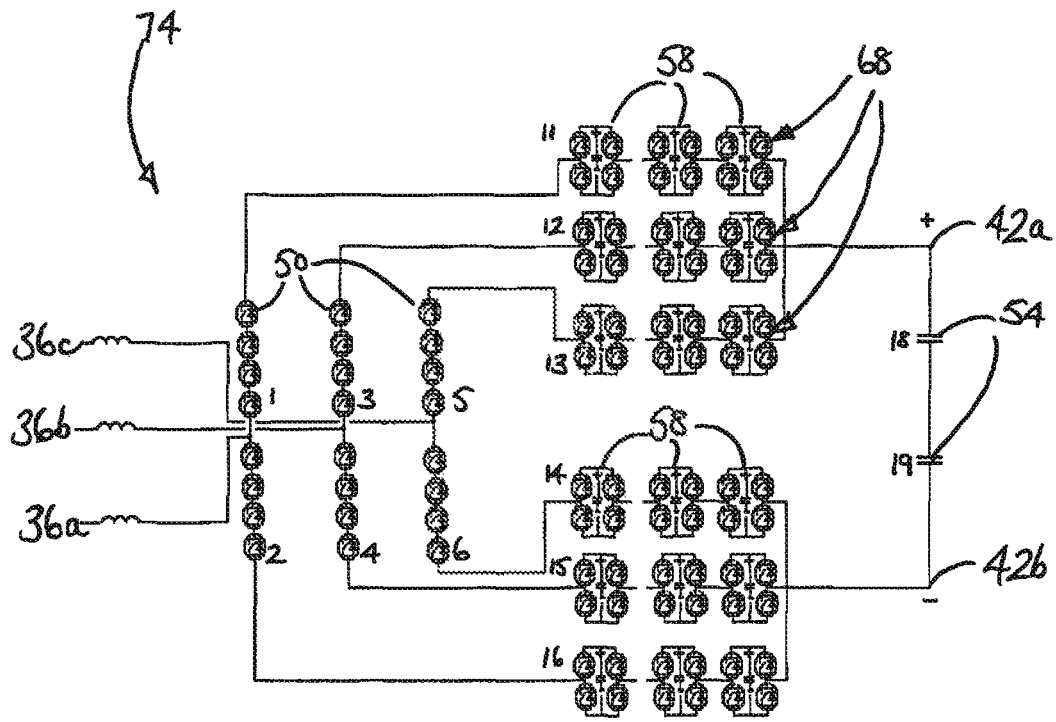
FIG. 8 shows a first hybrid voltage source converter constructed in accordance with the invention.

A first hybrid voltage source converter 74 constructed using the circuit 22 shown in FIG. 3 is shown in FIG. 8.

The hybrid voltage source converter 74 includes three AC terminals 36a-36c and a pair of DC terminals 42a,42b.

Each of the first elements included in the circuit 22, Elements 1 to 6, is configured to include a plurality of semiconductor switches 50 connected in series.

Of the second elements included in the circuit 22, each of Elements 11 to 16 is configured to include a plurality of bipolar modules 58 connected in series to form a chain-link converter 68 and each of Elements 18 and 19 is configured to include a fixed capacitor 54.

The other second elements included in the circuit 22, Elements 7 to 10, 17 and 20 are configured to be bypassed.

Figure 9:
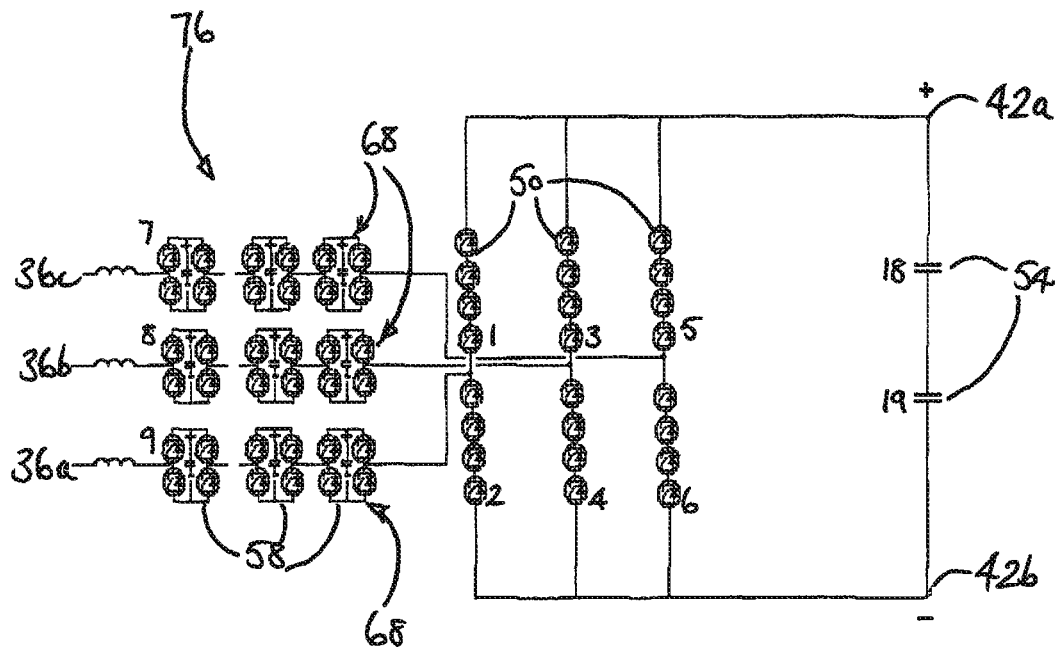
FIG. 9 shows a second hybrid voltage source converter constructed in accordance with the invention.

A second hybrid voltage source converter 76 constructed using the circuit 22 shown in FIG. 3 is shown in FIG. 9.

The hybrid voltage source converter 76 includes three AC terminals 36a-36c and a pair of DC terminals 42a,42b.

Each of the first elements included in the circuit 22, Elements 1 to 6, is configured to include a plurality of semiconductor switches 50 connected in series.

Of the second elements included in the circuit 22, each of Elements 7 to 9 is configured to include a plurality of bipolar modules 58 connected in series to form a chain-link converter 68 and each of Elements 18 and 19 is configured to include a fixed capacitor 54.

The other second elements included in the circuit 22, Elements 10 to 17 and 20 are configured to be bypassed.

Figure 10:
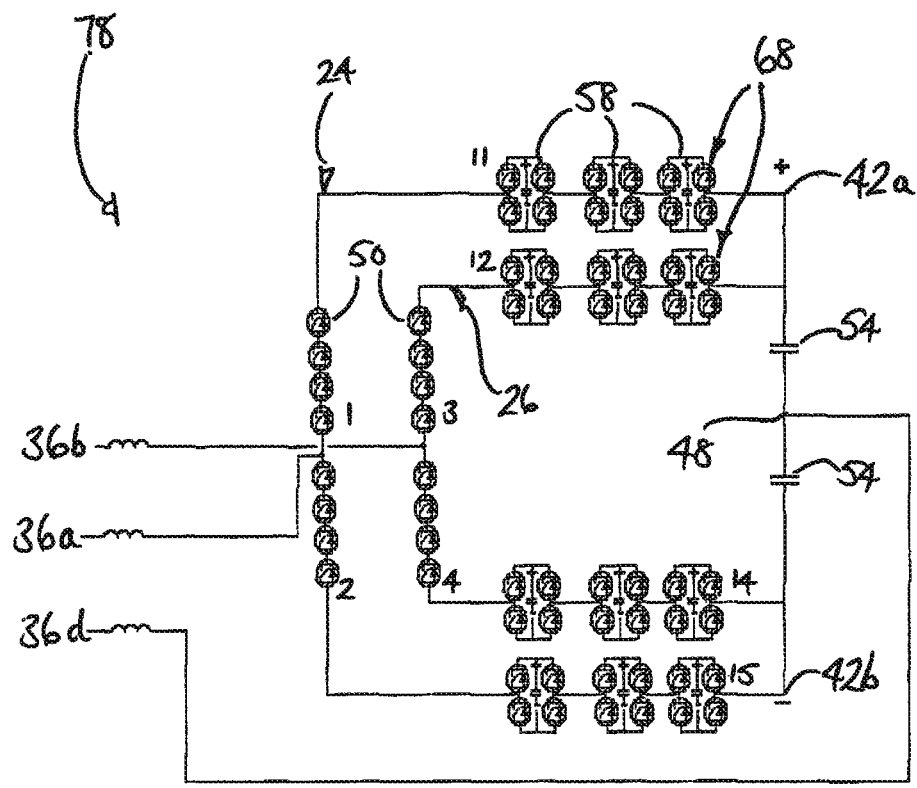
FIG. 10 shows a third hybrid voltage source converter constructed in accordance with the invention.

A third hybrid voltage source converter 78 constructed using the circuit 22 shown in FIG. 3 is shown in FIG. 10.

The hybrid voltage source converter 78 includes three AC terminals 36a,36b,36d and a pair of DC terminals 42a,42b.

Each of Elements 1 to 4 of the first elements included in the circuit 22 is configured to include a plurality of semiconductor switches 50 connected in series. The other first elements included in the circuit 22, Elements 5 and 6, are configured to be disconnected.

Of the second elements included in the circuit 22, each of Elements 11, 12, 14 and 15 is configured to include a plurality of bipolar modules 58 connected in series to form a chain-link capacitor 68 and each of Elements 18 and 19 is configured to include a fixed capacitor 54.

Of the other second elements included in the circuit 22, Elements 10, 17 and 20 are configured to be bypassed and Elements 13 and 16 are configured to be disconnected.

While the voltage source converter 78 includes three AC terminals 36a,36b,36d, it only includes two active converter limbs 24,26, which may be connected to two phases of an AC network via two of the AC terminals 36a,36b.

The third phase of the AC network is connected via the other AC terminal 36d directly to the DC side neutral point connection 46 between Elements 18 and 19.

The generation of voltage waveforms in the first two active limbs 24,26 causes a similar voltage waveform to be generated at the DC side neutral point connection 48. As a result, the voltage source converter 78 only requires the use of two converter limbs 24,26 to provide power conversion between a DC network and a three-phase AC network.

Figure 11:
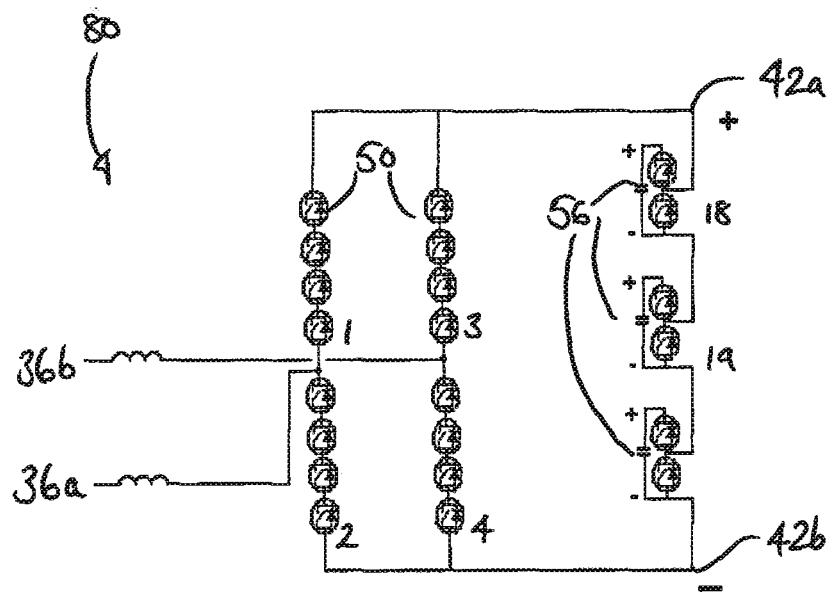
FIG. 11 shows a fourth hybrid voltage source converter constructed in accordance with the invention.

A fourth hybrid voltage source converter 80 constructed using the circuit 22 shown in FIG. 3 is shown in FIG. 11.

The hybrid voltage source converter 80 includes two AC terminals 36a,36b and a pair of DC terminals 42a,42b.

Each of Elements 1 to 4 of the first elements included in the circuit 22 is configured to include a plurality of semiconductor switches 50 connected in series. The other first elements included in the circuit 22, Elements 5 and 6, are configured to be disconnected.

Of the second elements included in the circuit 22, each of Elements 18 and 19 is configured to include a unipolar module 56, Element 18 including two unipolar modules 56 and Element 19 including one unipolar module 56.

Of the other second elements included in the circuit 22, Elements 8, 9, 11, 12, 15, 16, 17 and 20 are configured to be bypassed and Elements 7, 10, 13 and 14 are configured to be disconnected.

The voltage source converter 80 is suitable for interconnecting a single-phase AC network and a DC network. This shows that the circuit 22 is flexible enough to provide different configurations of voltage source converter for connection to three-phase or single-phase AC networks.

In other embodiments it is envisaged that the arrangement of fixed capacitors 54 and/or unipolar modules 56 and/or bipolar modules 58 in Elements 18 and 19 may be varied without affecting the functionality of the voltage source converter. For example, in a variant of the voltage source converter 80 shown in FIG. 11, two unipolar modules 56 may be included in Element 19 and one unipolar module 56 may be included in Element 18. It is also envisaged that in other variants all of the unipolar modules 56 may be included in one of Elements 18 and 19 with the other of Elements 18 and 19 being bypassed.

In other embodiments, where a DC mid (neutral) point is required between Elements 18 and 19, an equal number of fixed capacitors 54 and/or unipolar modules 56 and/or bipolar modules 58 may be included in each of Elements 18 and 19 so that Elements 18 and 19 contain equal and balanced arrangement of electronic components.

Each of the voltage source converters 74,76,78,80 shown in FIGS. 8 to 11 may be controllable, in use, to produce desirable results in the conversion of power between AC and DC networks. For example, the semiconductor switches may be controllable to switch at low frequency, giving a low-loss converter design. In addition, harmonic components may be deliberately created to control harmonic voltages and currents on both the AC and DC sides of the converter.

Other configurations of voltage source converter may be created by modifying the electrical components that each of the first and second elements is configurable to include.

Net real power may be transferred into or out of the capacitors in some configurations when unipolar modules 56 or fixed capacitors 54 are used on the DC side of the converter when the direction of the current cannot be switched. The transfer of real power causes continuous charging or discharging of the capacitors 60 of the unipolar modules and the fixed capacitors 54 leading to an unsustainable converter operation.

Figure 12:
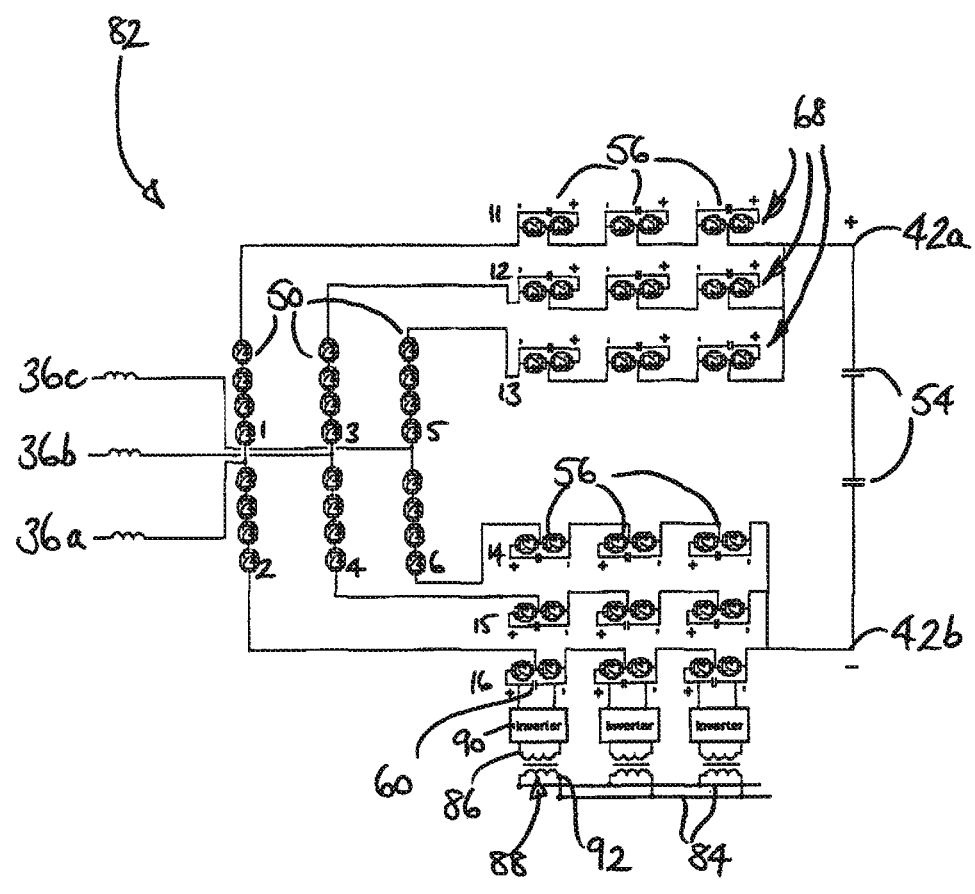
FIG. 12 shows a fifth hybrid voltage source converter constructed in accordance with the invention.

In order to mitigate this effect, an auxiliary power bus may be provided and a voltage source converter 82 including an auxiliary power bus 84 is shown in FIG. 12.

The voltage source converter 82 is essentially the same as the voltage source converter 74 shown in FIG. 8 except that each of Elements 11 to 16 is configured to include a plurality of unipolar modules 56, in place of bipolar module 58, connected in series to form a chain-link converter 68.

The capacitor 60 of each of the unipolar modules 56 is connected to a first winding 86 of a transformer arrangement 88 via a DC to AC inverter 90. A second winding 92 of the transformer arrangement 88 is connected to the auxiliary power bus 84.

The electrical connection of the auxiliary power bus 84 to the individual capacitors 60 allows real power to be transferred between the capacitors 60 and the auxiliary power bus 84 to maintain voltage balance in the capacitors 60.

Another option for mitigating the effect of the transfer of net real power is to reset any fixed capacitors 54 or the capacitors 60 of an unipolar modules 56 through temporary connection, in use, to a voltage source. For example when a voltage source converter is connected between an AC network and a DC network, the capacitors may be temporarily connected to the DC network so as to restore the voltage balance in the capacitors and prevent long term voltage drift.

A further option for mitigating the effect of the transfer of net real power is to use real power sources, such as batteries, fuel cells, photovoltaic cells or AC generater-rectified units, instead of capacitors.

The invention claimed is:

1. A circuit for a hybrid voltage source converter suitable for high voltage DC power transmission and reactive power compensation, the circuit comprising a plurality of first elements each including a first circuit arrangement and a plurality of second elements each including a second circuit arrangement, wherein the first circuit arrangement and the second circuit arrangement are different, the circuit further including AC terminals connectable, in use, to an AC network and DC terminals connectable, in use, to a DC network, wherein a first set of the plurality of second elements is connected between the AC terminals and the plurality of first elements and a second set of the plurality of second elements is connected between the plurality of first elements and the DC terminals, each of the first and second elements being configured to be bypassed or to be disconnected to construct, in use, new hybrid voltage source converter configurations including at least one first element and at least one second element, and a third set of the plurality of second elements is connected between common point connections defined by the second set of the plurality of second elements and the DC terminals.

2. The circuit according to claim 1 wherein each of the first elements includes a plurality of semiconductor switches connected in series.

3. The circuit according to claim 2 wherein each semiconductor switch is an insulated gate-bipolar transistor, a gate turn-off thyristor or a field-effect transistor.

4. The circuit according to claim 1 wherein each of the first elements includes a plurality of semiconductor switches connected to define a multi-level converter element.

5. The circuit according to claim 1 wherein at least one of the second elements includes at least one energy storage device.

6. The circuit according to claim 1 wherein at least one of the second elements includes at least one module, the at least one module including an energy storage device connected with at least one pair of semiconductor switches that are controllable, in use, to provide a continuously variable voltage source.

7. The circuit according to claim 6 wherein at least one of the second elements is configured to include a plurality of modules connected in series to define a chain-link converter element.

8. The circuit according to claim 6 wherein the at least one module includes an energy storage device connected in parallel with a pair of semiconductor switches in a half-bridge arrangement to define a 2-quadrant unipolar module that can develop zero or positive voltage and can conduct current in both directions.

9. The circuit according to claim 6 wherein the at least one module includes an energy storage device connected in parallel with two pairs of semiconductor switches in a full-bridge arrangement to define a 4-quadrant bipolar module that can develop zero, positive or negative voltage and can conduct current in both directions.

10. The circuit according to claim 5 or claim 6, wherein the at least one energy storage device is connected to an auxiliary power bus.

11. The circuit according to claim 5 or claim 6, wherein the at least one energy storage device is connectable temporarily, in use, to an external voltage source to reset the energy storage device.

12. The circuit according to claim 5 or claim 6, wherein the at least one energy storage device is a capacitor.

13. The circuit according to claim 5 or claim 6, wherein the at least one energy storage device is a battery, a fuel cell, a photovoltaic cell or an AC generater-rectified source.

14. A hybrid voltage source converter including the circuit according to claim 1.

* * * * *